US012639268B2

(12) United States Patent
Chawla et al.

(10) Patent No.: US 12,639,268 B2
(45) Date of Patent: *May 26, 2026

(54) UPDATES AND DELETES IN RETRIEVAL-ACCESS GENERATION INGESTION VERSIONING

(71) Applicant: Dell Products L.P., Round Rock, TX (US)

(72) Inventors: Gaurav Chawla, Austin, TX (US); Adam E. Brenner, Mission Viejo, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/946,770

(22) Filed: Nov. 13, 2024

(65) Prior Publication Data

US 2026/0133940 A1    May 14, 2026

(51) Int. Cl.
*G06F 7/00* (2006.01)
*G06F 16/14* (2019.01)
*G06F 16/174* (2019.01)

(52) U.S. Cl.
CPC ........ *G06F 16/1752* (2019.01); *G06F 16/152* (2019.01)

(58) Field of Classification Search
CPC ........................... G06F 16/1752; G06F 16/152
See application file for complete search history.

(56) References Cited

U.S. PATENT DOCUMENTS

| | | | | |
|---|---|---|---|---|
| 9,336,092 B1 * | 5/2016 | Li | .......................... | G06F 21/602 |
| 11,194,792 B2 | 12/2021 | Lu | | |
| 12,020,140 B1 * | 6/2024 | Mondlock | ............ | G06N 3/0455 |
| 12,079,570 B1 * | 9/2024 | Mondlock | ............... | G06F 40/20 |
| 12,135,740 B1 * | 11/2024 | Yu | ........................ | G06F 16/3329 |
| 12,164,664 B1 * | 12/2024 | Dupont | ................. | H04L 9/3213 |
| 12,204,565 B1 * | 1/2025 | Yu | ........................ | G06F 16/9024 |

(Continued)

OTHER PUBLICATIONS

Chawla, et al. "Deduplication in Retrieval-Access Generation Ingestion Versioning" U.S. Appl. No. 18/946,762, filed Nov. 13, 2024, 53 pages.

(Continued)

*Primary Examiner* — Mohammed R Uddin
(74) *Attorney, Agent, or Firm* — Amin, Turocy & Watson, LLP

(57) ABSTRACT

A system can, based on a retrieval-augmented generation (RAG) process ingesting data, query a search system to identify at least one first portion of the data that has at least one third generation identifier that is greater than second generation identifiers in a checkpoint; create second chunks from the at least one first portion of the data; in response to second chunks being duplicates of first chunks, based on hash values, store first identifiers of the second chunks; remove the stored chunk identifiers from second identifiers of chunks that correspond to chunks that existed in a RAG system prior to the ingesting, to produce stale chunk identifiers; remove, from the RAG system, third chunks that are identified by the stale chunk identifiers, and, in response to the second chunks being determined to be unique relative to the first chunks, store the second chunks in the RAG system.

20 Claims, 11 Drawing Sheets

(56)     References Cited

U.S. PATENT DOCUMENTS

| 12,235,882 | B1 * | 2/2025 | Chawla | G06F 16/285 |
|---|---|---|---|---|
| 12,277,409 | B1 * | 4/2025 | Leeman-Munk | G06F 8/35 |
| 12,401,743 | B1 * | 8/2025 | Paliwal | G06N 3/02 |
| 2015/0234710 | A1 | 8/2015 | Berrington | |
| 2018/0246950 | A1 * | 8/2018 | Arye | G06F 16/2272 |
| 2020/0334254 | A1 * | 10/2020 | Arye | G06F 16/2393 |
| 2024/0046318 | A1 | 2/2024 | Muriqi | |
| 2024/0111498 | A1 * | 4/2024 | Vaughn | G06F 8/30 |
| 2024/0256592 | A1 | 8/2024 | O'Neill | |
| 2024/0256678 | A1 | 8/2024 | Thompson | |
| 2024/0311342 | A1 * | 9/2024 | Shankar | G06F 16/1752 |
| 2024/0362208 | A1 | 10/2024 | Naufel | |
| 2024/0380802 | A1 * | 11/2024 | Gill | G06Q 10/06311 |
| 2024/0386015 | A1 * | 11/2024 | Crabtree | G06F 16/9024 |
| 2024/0394965 | A1 | 11/2024 | Doggett | |
| 2024/0411528 | A1 | 12/2024 | Ziolkowski | |
| 2024/0412720 | A1 | 12/2024 | Vasylyev | |
| 2024/0419830 | A1 | 12/2024 | Park | |
| 2025/0094400 | A1 * | 3/2025 | Mishra | G06F 16/2246 |
| 2025/0117412 | A1 * | 4/2025 | Jalagam | G06F 16/285 |
| 2025/0190802 | A1 * | 6/2025 | Kar | G06N 3/0895 |
| 2025/0209312 | A1 * | 6/2025 | Crabtree | G06N 3/0475 |
| 2025/0245218 | A1 * | 7/2025 | Longoni | G06F 16/24578 |
| 2025/0252359 | A1 * | 8/2025 | Pesala | G06N 20/20 |
| 2025/0265071 | A1 * | 8/2025 | Ananthesweran | G06F 8/65 |

OTHER PUBLICATIONS

Notice of Allowance mailed Oct. 16, 2025 for U.S. Appl. No. 18/946,762, 36 pages.

* cited by examiner

200

UPDATES AND DELETES IN RAG INGESTION
VERSIONING COMPONENT 210

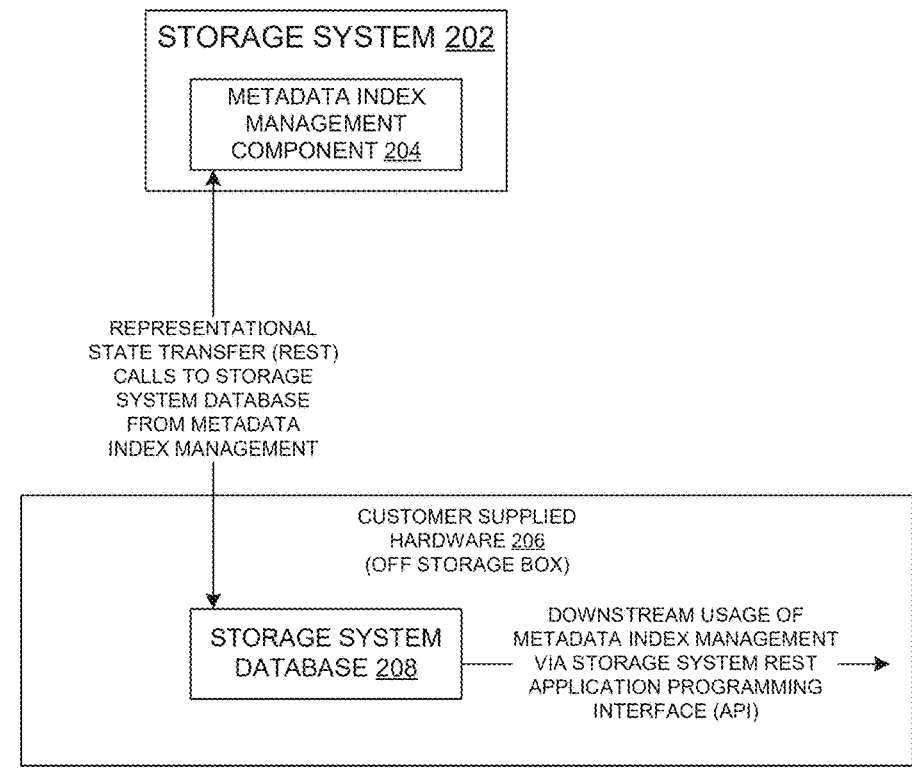

STORAGE SYSTEM 202

METADATA INDEX
MANAGEMENT
COMPONENT 204

REPRESENTATIONAL
STATE TRANSFER (REST)
CALLS TO STORAGE
SYSTEM DATABASE
FROM METADATA
INDEX MANAGEMENT

CUSTOMER SUPPLIED
HARDWARE 206
(OFF STORAGE BOX)

STORAGE SYSTEM
DATABASE 208

DOWNSTREAM USAGE OF
METADATA INDEX MANAGEMENT
VIA STORAGE SYSTEM REST
APPLICATION PROGRAMMING
INTERFACE (API)

FIG. 2

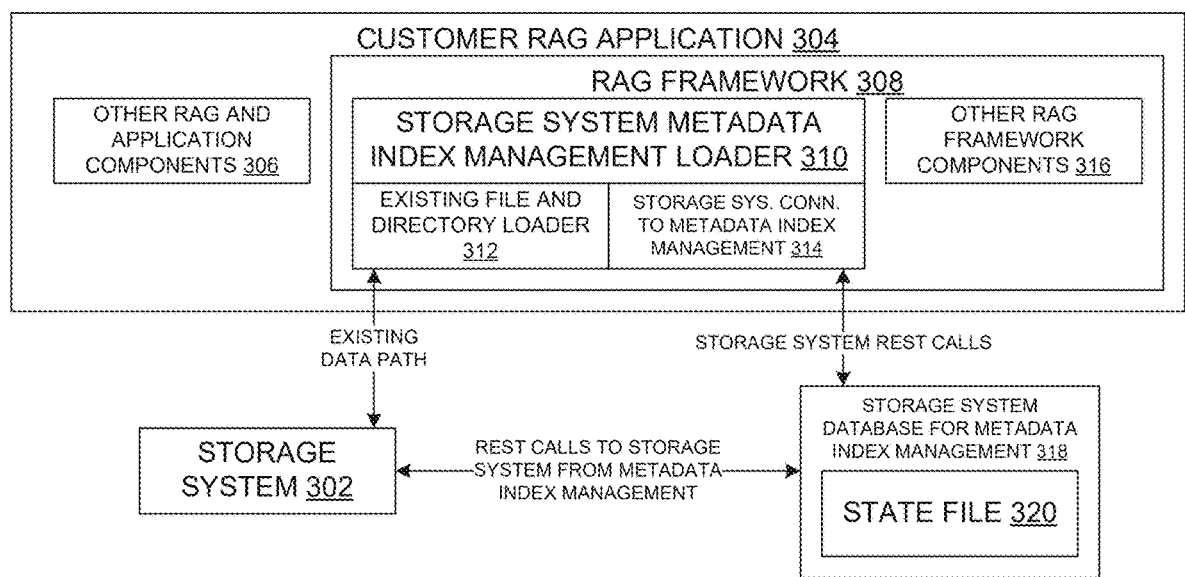
FIG. 3

400

```
{
  "folder paths": [
    {
      "path": "/johndoe/data",
      "generation": 42,
      "links": [
        {
          "source_file": <name of file or unique file indetifier like inode or hash>",
          "chunks": [
            {
              "source_chunk_hash": "9A6747FC6259AA374AB4E1BB03074B6EC672CF99",
              "embeedding_hash": "DD5820E99B7522E2D81C7E92EED6EF4AEB7649A9"
            },
            {
              "source_chunk_hash": "4A0771A62988B5FF979A5C05C2FB91A7473EF08B",
              "embeedding_hash": "D18229E017040C1EB5B55F2915F055191A6BBBE6"
            }
            ... etc ...
          ]
        },
        ... etc ...
      ]
    },
    {
      "path": "/janedoe",
      "generation": 24,
      "links": [
        {
          "source_file": <name of file or unique file indetifier like inode or hash>",
          "chunks": [
            {
              "source_chunk_hash": "150B55FC5D76FBBDF7170CECA0C214F5848C7C8B",
              "embeedding_hash": "5E7F15462F46F832CF8C43C8B960C817401C52C1"
            },
            {
              "source_chunk_hash": "F3AF15BD5C8DAC18B338C8CE05A526A8A2BF57E6",
              "embeedding_hash": "FFC0384ADAFCFA9439A1666CEC6423F991A4FC4E"
            }
            ... etc ...
          ]
        },
        ... etc ...
      ]
    }
  ]
}
```

FIG. 4

500

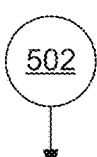

502

THE METADATA INDEX MANAGEMENT COMPONENT STORING RECORDS IN A SEARCH SERVER, AND UPDATING EXISTING SEARCH SERVER RECORDS BASED ON CHANGES TO THE COMPUTER STORAGE SYSTEM (E.G., UPDATED OR DELETED FILES) 504

THE DATA CONNECTOR ACCESSING A MAPPING OF CHUNKS AND EMBEDDINGS TO SOURCE FILES FROM THE COMPUTER STORAGE SYSTEM 506

THE DATA CONNECTOR DETERMINING WHAT FILES HAVE BEEN ADDED, AND WHETHER THOSE FILES HAS BEEN UPDATED OR DELETED FROM THE COMPUTER STORAGE SYSTEM 508

FOR FILES THAT BEEN MARKED AS UPDATED BY THE METADATA INDEX MANAGEMENT COMPONENT, THE DATA CONNECTOR ANALYZING THE MAPPING OF PREVIOUSLY GENERATED CHUNKS AND EMBEDDINGS, AND IMPLEMENTING PROCESS FLOW 600 OF FIG. 6 510

FOR FILES THAT BEEN MARKED AS DELETED BY THE METADATA INDEX MANAGEMENT COMPONENT, THE DATA CONNECTOR ANALYZING THE MAPPING FOR PREVIOUSLY-GENERATED CHUNKS AND EMBEDDING, AND DELETING CHUNKS AND EMBEDDINGS 512

600

602

CREATING NEW CHUNKS OF FILES WITH UNIQUE HASHES 604

DETERMINING WHICH CHUNKS ARE DUPLICATE BY COMPARING THEIR UNIQUE HASHES WITH HASHES OF PREVIOUSLY GENERATED CHUNKS 606

IF A CHUNK IS A DUPLICATE, ADD A HASH FOR THAT CHUNK AND CORRESPONDING EMBEDDING TO CHUNKS_EMBEDDINGS_DUPLICATE 608

IF A CHUNK IS UNIQUE, CREATING A CORRESPONDING EMBEDDING; STORING THE NEW CHUNK AND EMBEDDING IN A CHUNK DATABASE AND A VECTOR DATABASE 610

AFTER PROCESSING THE FILES, INITIATING A CLEANUP PHASE 612

DETERMINING THAT A FILE HAS BEEN MARKED AS DELETED 704

IDENTIFYING THE CORRESPONDING CHUNKS AND EMBEDDINGS IN THEIR RESPECTIVE SYSTEMS 706

DELETING THE CORRESPONDING CHUNKS AND EMBEDDINGS 708

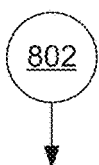

STORING A CHECKPOINT THAT COMPRISES PAIRS AND FIRST HASH VALUES, WHEREIN RESPECTIVE PAIRS OF THE PAIRS COMPRISE RESPECTIVE IDENTIFICATIONS OF AT LEAST SOME RESPECTIVE FIRST DATA STORED IN A STORAGE SYSTEM AND RESPECTIVE SECOND GENERATION IDENTIFIERS THAT CORRESPOND TO THE RESPECTIVE DATA, AND WHEREIN RESPECTIVE FIRST HASH VALUES OF THE FIRST HASH VALUES CORRESPOND TO FIRST CHUNKS OF THE AT LEAST SOME RESPECTIVE FIRST DATA 804

BASED ON EXECUTING A RETRIEVAL-AUGMENTED GENERATION PROCESS COMPRISING PERFORMANCE OF AN ITERATION OF INGESTING DATA FROM THE STORAGE SYSTEM AND TO SEND THE DATA TO BE INGESTED BY A RETRIEVAL-AUGMENTED GENERATION SYSTEM, WHEREIN THE RETRIEVAL-AUGMENTED GENERATION PROCESS IS CONFIGURED TO INGEST THE DATA VIA A COMMUNICATIONS PROTOCOL THAT OMITS TRACKING OF PREVIOUSLY-INGESTED DATA; QUERYING A SEARCH SYSTEM TO IDENTIFY AT LEAST ONE FIRST PORTION OF THE DATA THAT HAS AT LEAST ONE RESPECTIVE THIRD GENERATION IDENTIFIER THAT IS GREATER THAN THE RESPECTIVE SECOND GENERATION IDENTIFIERS IN THE CHECKPOINT, WHEREIN THE SEARCH SYSTEM STORES RESPECTIVE METADATA OF RESPECTIVE FIRST DATA FROM THE STORAGE SYSTEM, AND WHEREIN THE RESPECTIVE METADATA COMPRISES RESPECTIVE FIRST GENERATION IDENTIFIERS THAT INDICATE RESPECTIVE UPDATES TO THE RESPECTIVE FIRST DATA; CREATING SECOND CHUNKS FROM THE AT LEAST ONE FIRST PORTION OF THE DATA; IN RESPONSE TO RESPECTIVE SECOND CHUNKS OF THE SECOND CHUNKS BEING DETERMINED TO BE DUPLICATES OF RESPECTIVE FIRST CHUNKS OF THE FIRST CHUNKS, BASED ON THE RESPECTIVE FIRST HASH VALUES AND RESPECTIVE SECOND HASH VALUES OF THE RESPECTIVE SECOND CHUNKS, STORING FIRST IDENTIFIERS OF THE RESPECTIVE SECOND CHUNKS, TO PRODUCE STORED CHUNK IDENTIFIERS; REMOVING THE STORED CHUNK IDENTIFIERS FROM SECOND IDENTIFIERS OF CHUNKS THAT CORRESPOND TO CHUNKS THAT EXISTED IN THE RETRIEVAL-AUGMENTED GENERATION SYSTEM PRIOR TO THE PERFORMANCE OF THE ITERATION OF THE INGESTING OF THE DATA, TO PRODUCE STALE CHUNK IDENTIFIERS; REMOVING, FROM THE RETRIEVAL-AUGMENTED GENERATION SYSTEM, THIRD CHUNKS THAT ARE IDENTIFIED BY THE STALE CHUNK IDENTIFIERS, AND IN RESPONSE TO THE RESPECTIVE SECOND CHUNKS BEING DETERMINED TO BE UNIQUE RELATIVE TO THE RESPECTIVE FIRST CHUNKS, STORING THE RESPECTIVE SECOND CHUNKS IN THE RETRIEVAL-AUGMENTED GENERATION SYSTEM 806

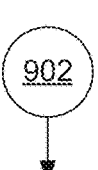

902

BASED ON PERFORMANCE OF AN ITERATION OF INGESTING DATA FROM A STORAGE SYSTEM AND TO SEND THE DATA TO BE INGESTED BY A RETRIEVAL-AUGMENTED GENERATION SYSTEM, QUERYING A SEARCH SYSTEM TO IDENTIFY AT LEAST ONE FIRST PORTION OF THE DATA THAT HAS AT LEAST ONE RESPECTIVE THIRD GENERATION IDENTIFIER THAT IS GREATER THAN RESPECTIVE SECOND GENERATION IDENTIFIERS IN A CHECKPOINT THAT COMPRISES PAIRS AND FIRST HASH VALUES, WHEREIN RESPECTIVE PAIRS OF THE PAIRS COMPRISE RESPECTIVE IDENTIFICATIONS OF AT LEAST SOME RESPECTIVE FIRST DATA STORED IN THE STORAGE SYSTEM AND RESPECTIVE SECOND GENERATION IDENTIFIERS THAT CORRESPOND TO THE RESPECTIVE DATA, WHEREIN RESPECTIVE FIRST HASH VALUES OF THE FIRST HASH VALUES CORRESPOND TO FIRST CHUNKS OF THE AT LEAST SOME RESPECTIVE FIRST DATA, WHEREIN THE SEARCH SYSTEM STORES RESPECTIVE METADATA OF RESPECTIVE FIRST DATA FROM THE STORAGE SYSTEM, AND WHEREIN THE RESPECTIVE METADATA COMPRISES RESPECTIVE FIRST GENERATION IDENTIFIERS THAT INDICATE RESPECTIVE UPDATES TO THE RESPECTIVE FIRST DATA 904

CREATING SECOND CHUNKS FROM THE AT LEAST ONE FIRST PORTION OF THE DATA 906

RESPONSIVE TO RESPECTIVE SECOND CHUNKS OF THE SECOND CHUNKS BEING DETERMINED TO BE DUPLICATES OF RESPECTIVE FIRST CHUNKS OF THE FIRST CHUNKS, BASED ON THE RESPECTIVE FIRST HASH VALUES AND RESPECTIVE SECOND HASH VALUES OF THE RESPECTIVE SECOND CHUNKS, STORING FIRST IDENTIFIERS OF THE RESPECTIVE SECOND CHUNKS, TO PRODUCE STORED CHUNK IDENTIFIERS 908

REMOVING THE STORED CHUNK IDENTIFIERS FROM SECOND IDENTIFIERS OF CHUNKS THAT CORRESPOND TO CHUNKS THAT EXISTED IN THE RETRIEVAL-AUGMENTED GENERATION SYSTEM PRIOR TO THE PERFORMANCE OF THE ITERATION OF THE INGESTING OF THE DATA, TO PRODUCE STALE CHUNK IDENTIFIERS 910

REMOVING, FROM THE RETRIEVAL-AUGMENTED GENERATION SYSTEM, THIRD CHUNKS THAT ARE IDENTIFIED BY THE STALE CHUNK IDENTIFIERS 912

RESPONSIVE TO THE RESPECTIVE SECOND CHUNKS BEING DETERMINED TO BE UNIQUE RELATIVE TO THE RESPECTIVE FIRST CHUNKS, STORING THE RESPECTIVE SECOND CHUNKS IN THE RETRIEVAL-AUGMENTED GENERATION SYSTEM 914

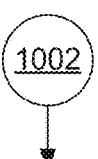

1002

BASED ON INGESTING DATA FROM A STORAGE SYSTEM AND TO A RETRIEVAL-AUGMENTED GENERATION SYSTEM, QUERYING A SEARCH SYSTEM TO IDENTIFY AT LEAST ONE FIRST PORTION OF THE DATA THAT HAS AT LEAST ONE RESPECTIVE THIRD GENERATION IDENTIFIER THAT IS GREATER THAN RESPECTIVE SECOND GENERATION IDENTIFIERS IN A STATE FILE THAT COMPRISES PAIRS AND FIRST HASH VALUES, WHEREIN RESPECTIVE PAIRS OF THE PAIRS COMPRISE RESPECTIVE IDENTIFICATIONS OF AT LEAST SOME RESPECTIVE FIRST DATA STORED IN THE STORAGE SYSTEM AND RESPECTIVE SECOND GENERATION IDENTIFIERS THAT CORRESPOND TO THE RESPECTIVE DATA, AND WHEREIN RESPECTIVE FIRST HASH VALUES OF THE FIRST HASH VALUES CORRESPOND TO FIRST CHUNKS OF THE AT LEAST SOME RESPECTIVE FIRST DATA, AND WHEREIN THE SEARCH SYSTEM STORES RESPECTIVE METADATA OF RESPECTIVE FIRST DATA FROM THE STORAGE SYSTEM THAT COMPRISES RESPECTIVE FIRST GENERATION IDENTIFIERS THAT INDICATE RESPECTIVE UPDATES TO THE RESPECTIVE FIRST DATA 1004

CREATING SECOND CHUNKS FROM THE AT LEAST ONE FIRST PORTION OF THE DATA 1006

WHERE THE RESPECTIVE FIRST HASH VALUES AND RESPECTIVE SECOND HASH VALUES OF RESPECTIVE SECOND CHUNKS OF THE SECOND CHUNKS INDICATE THAT AT LEAST SOME OF THE RESPECTIVE SECOND CHUNKS OF THE SECOND CHUNKS ARE DUPLICATES OF RESPECTIVE FIRST CHUNKS OF THE FIRST CHUNKS, STORING FIRST IDENTIFIERS OF THE AT LEAST SOME OF THE RESPECTIVE SECOND CHUNKS, TO PRODUCE STORED CHUNK IDENTIFIERS 1008

REMOVING THE STORED CHUNK IDENTIFIERS FROM SECOND IDENTIFIERS OF CHUNKS THAT CORRESPOND TO CHUNKS THAT EXISTED IN THE RETRIEVAL-AUGMENTED GENERATION SYSTEM PRIOR TO THE INGESTING OF THE DATA, TO PRODUCE STALE CHUNK IDENTIFIERS 1010

REMOVING, FROM THE RETRIEVAL-AUGMENTED GENERATION SYSTEM, THIRD CHUNKS THAT ARE IDENTIFIED BY THE STALE CHUNK IDENTIFIERS 1012

UPDATES AND DELETES IN RETRIEVAL-ACCESS GENERATION INGESTION VERSIONING

RELATED APPLICATIONS

The subject patent application is related by subject matter to, U.S. patent application Ser. No. 18/946,762, filed Nov. 13, 2024 and entitled "DEDUPLICATION IN RETRIEVAL-ACCESS GENERATION INGESTION VERSIONING," the entirety of which application is hereby incorporated by reference herein.

BACKGROUND

A retrieval-access generation (RAG) system can generally comprise a large language model (LLM) that operates on a specific information set (e.g., a set of documents) so that the LLM is configured to respond to queries based on that information set. A LLM can generally comprise a form of generative artificial intelligence (AI) that is configured to generative natural-language response outputs to natural-language query inputs.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can store a checkpoint that comprises pairs and first hash values, wherein respective pairs of the pairs comprise respective identifications of at least some respective first data stored in a storage system and respective second generation identifiers that correspond to the respective data, and wherein respective first hash values of the first hash values correspond to first chunks of the at least some respective first data. The system can, based on executing a retrieval-augmented generation process comprising performance of an iteration of ingesting data from the storage system and to send the data to be ingested by a retrieval-augmented generation system, wherein the retrieval-augmented generation process is configured to ingest the data via a communications protocol that omits tracking of previously-ingested data, query a search system to identify at least one first portion of the data that has at least one respective third generation identifier that is greater than the respective second generation identifiers in the checkpoint, wherein the search system stores respective metadata of respective first data from the storage system, and wherein the respective metadata comprises respective first generation identifiers that indicate respective updates to the respective first data; create second chunks from the at least one first portion of the data; in response to respective second chunks of the second chunks being determined to be duplicates of respective first chunks of the first chunks, based on the respective first hash values and respective second hash values of the respective second chunks, store first identifiers of the respective second chunks, to produce stored chunk identifiers; remove the stored chunk identifiers from second identifiers of chunks that correspond to chunks that existed in the retrieval-augmented generation system prior to the performance of the iteration of the ingesting of the data, to produce stale chunk identifiers; remove, from the retrieval-augmented generation system, third chunks that are identified by the stale chunk identifiers, and, in response to the respective second chunks being determined to be unique relative to the respective first chunks, store the respective second chunks in the retrieval-augmented generation system.

An example method can comprise based on performance of an iteration of ingesting data from a storage system and to send the data to be ingested by a retrieval-augmented generation system, querying, by a system comprising at least one processor, a search system to identify at least one first portion of the data that has at least one respective third generation identifier that is greater than respective second generation identifiers in a checkpoint that comprises pairs and first hash values, wherein respective pairs of the pairs comprise respective identifications of at least some respective first data stored in the storage system and respective second generation identifiers that correspond to the respective data, wherein respective first hash values of the first hash values correspond to first chunks of the at least some respective first data, wherein the search system stores respective metadata of respective first data from the storage system, and wherein the respective metadata comprises respective first generation identifiers that indicate respective updates to the respective first data. The method can further comprise creating, by the system, second chunks from the at least one first portion of the data. The method can further comprise, responsive to respective second chunks of the second chunks being determined to be duplicates of respective first chunks of the first chunks, based on the respective first hash values and respective second hash values of the respective second chunks, storing, by the system, first identifiers of the respective second chunks, to produce stored chunk identifiers. The method can further comprise removing, by the system, the stored chunk identifiers from second identifiers of chunks that correspond to chunks that existed in the retrieval-augmented generation system prior to the performance of the iteration of the ingesting of the data, to produce stale chunk identifiers. The method can further comprise removing, by the system and from the retrieval-augmented generation system, third chunks that are identified by the stale chunk identifiers. The method can further comprise responsive to the respective second chunks being determined to be unique relative to the respective first chunks, storing, by the system, the respective second chunks in the retrieval-augmented generation system.

An example non-transitory computer-readable medium can comprise instructions that, in response to execution, cause a system comprising a processor to perform operations. These operations can comprise, based on ingesting data from a storage system and to a retrieval-augmented generation system, querying a search system to identify at least one first portion of the data that has at least one respective third generation identifier that is greater than respective second generation identifiers in a state file that comprises pairs and first hash values, wherein respective pairs of the pairs comprise respective identifications of at least some respective first data stored in the storage system and respective second generation identifiers that correspond to the respective data, and wherein respective first hash values of the first hash values correspond to first chunks of the at least some respective first data, and wherein the search system stores respective metadata of respective first data from the storage system that comprises respective first generation identifiers that indicate respective updates to the respective first data. These operations can further comprise creating second chunks from the at least one first portion of the data. These operations can further comprise, where the respective first hash values and respective second hash values of respective second chunks of the second chunks indicate that at least some of the respective second chunks of the second chunks are duplicates of respective first chunks of the first chunks, storing first identifiers of the at least some of the respective second chunks, to produce stored chunk identifiers. These operations can further comprise removing the stored chunk identifiers from second identifiers of chunks that correspond to chunks that existed in the retrieval-augmented generation system prior to the ingesting of the data, to produce stale chunk identifiers. These operations can further comprise removing, from the retrieval-augmented generation system, third chunks that are identified by the stale chunk identifiers.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates another example system architecture that can facilitate updates and deletes in RAG ingestion versioning, in accordance with an embodiment of this disclosure;

FIG. 3 illustrates another example system architecture that can facilitate updates and deletes in RAG ingestion versioning, in accordance with an embodiment of this disclosure;

FIG. 4 illustrates an example state file that can facilitate updates and deletes in RAG ingestion versioning, in accordance with an embodiment of this disclosure;

FIG. 5 illustrates an example process flow that can facilitate updates and deletes in RAG ingestion versioning, in accordance with an embodiment of this disclosure;

FIG. 6 illustrates another example process flow that can facilitate updates and deletes in RAG ingestion versioning, in accordance with an embodiment of this disclosure;

FIG. 8 illustrates another example process flow that can facilitate updates and deletes in RAG ingestion versioning, in accordance with an embodiment of this disclosure;

FIG. 9 illustrates another example process flow that can facilitate updates and deletes in RAG ingestion versioning, in accordance with an embodiment of this disclosure;

FIG. 10 illustrates another example process flow that can facilitate updates and deletes in RAG ingestion versioning, in accordance with an embodiment of this disclosure.

DETAILED DESCRIPTION

Overview

Figure 1:
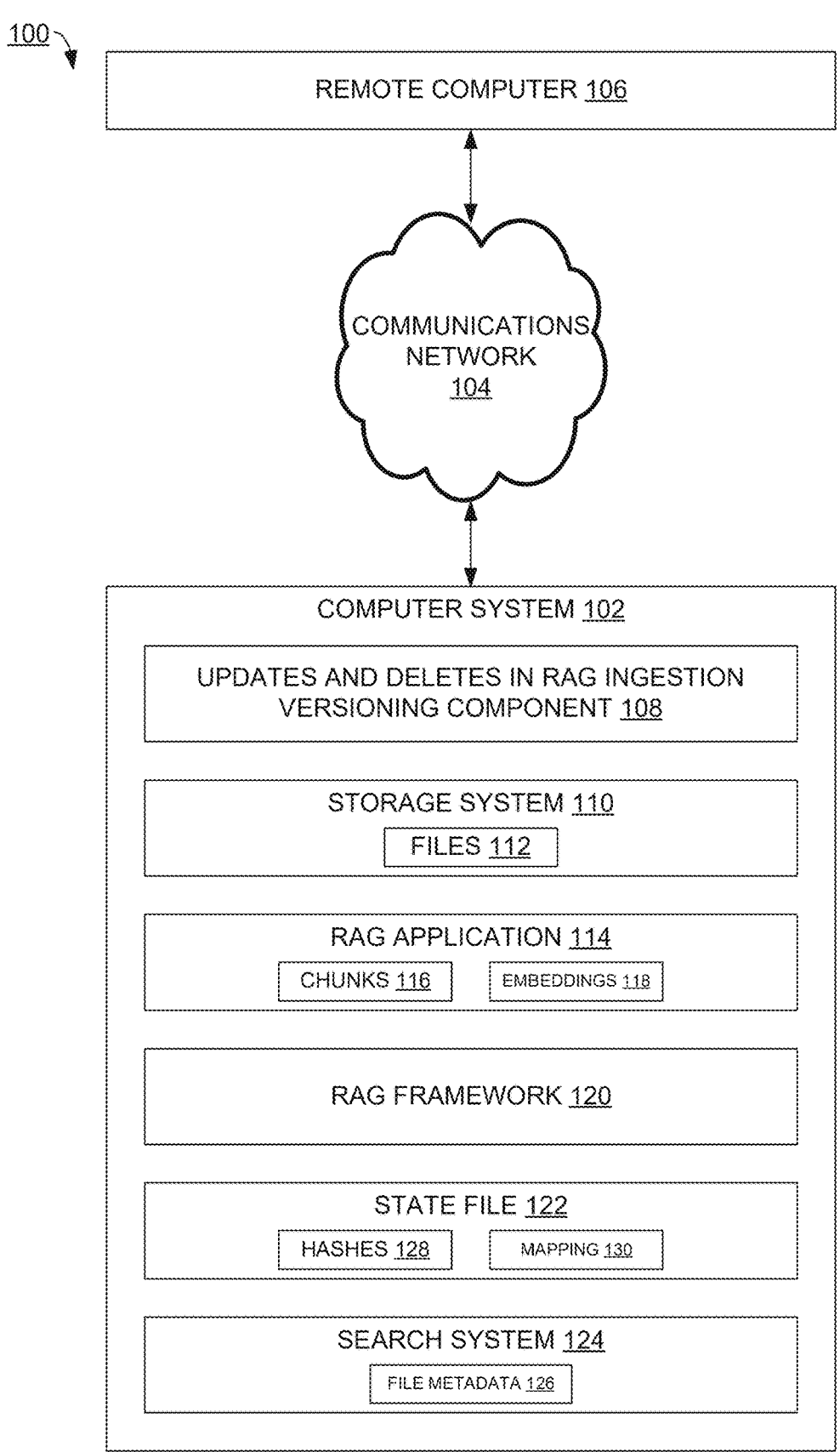
FIG. 1 illustrates an example system architecture that can facilitate updates and deletes in RAG ingestion versioning, in accordance with an embodiment of this disclosure.

In computer storage systems, there can be metadata index management. Metadata index management can comprise periodically exporting file system metadata from the computer storage system to a remote computer endpoint that can facilitate searching on that data.

It can be that metadata index management utilizes file backup snapshots (and an application programming interface (API) that facilitates determining differences between two snapshots).

The present techniques can implement metadata index management with artificial intelligence (AI) retrieval-augmented generation (RAG) systems to extend functionality, features, and integrations in accessing information about the files on a computer storage system.

A RAG framework can generally comprise a component that can read from source data and ingest it into a RAG application. There can be AI RAG frameworks that can read data from a computer storage system via various protocols (e.g., an object storage protocol or a network file storage (NFS) protocol. However, it can be that these frameworks do not keep track of which files were previously read, so do not perform detection of file changes.

A result can be a RAG framework that treats all data as brand new, regardless of whether 1 file or 1 billion files have changed. This can result in the RAG framework taking more time to process file changes, and consuming more compute and storage resources for a data ingestion process, compared with an implementation that does track file changes.

While it can be that prior protocols to read data from a computer storage system lack a mechanism to detect file changes, the computer storage system itself can track file changes.

The present techniques can be implemented to utilize metadata index management to create a document loader to a RAG framework that tracks which files have been processed and read by the RAG framework. When a RAG framework is re-run to ingest new data, the document loader can skip sending files that have already been processed, and instead send only those files that have not been processed by the RAG framework.

The present techniques can facilitate a reduction in time spent on re-ingesting data with a RAG framework, as well as a reduction in network, compute, and storage usage. This can enable data scientists to run a data processing workflow frequently, and enable use of this to trigger automated processing of changed files to create a real-time RAG.

It can be challenging for a person to determine which files have changed on a large system. Computer storage systems can store billions of files. Additionally, it can be that RAG frameworks lack an ability to track these files as the protocols they use (e.g., NFS) do not offer this feature.

The present techniques can be implemented with a connector for a RAG framework, which can be integrated with a computer storage system metadata index management feature.

What follows is a sample workflow according to the present techniques:

1. A computer storage system with metadata index management can be installed and configured to send results on a periodic bases to a remote search server.

2. A developer (e.g., a data scientist) can develop a RAG application using a RAG framework.

3. The developer can download and install a document loader for RAG framework according to the present techniques.

4. The developer can provide a hostname, credentials and path on a computer storage system to ingest data to the RAG framework and data loader (e.g., class arguments to the document loader). In some RAG frameworks, a document loader can comprise a plugin (e.g., a separate programming language class) that can be optionally used. Where the document loader comprises a class, the class arguments can comprise options and/or parameters (e.g., hostname, credentials, etc.).

5. The developer can run the RAG framework with the document loader.

6. The document loader can do the following:
   (A) Receive a hostname, credentials and path as input parameters, and verify that they are correct. There can be a fail where it is determined that the input parameters are not valid.
   (B) Read a state file maintained by the document loader and determine if the provided path was previously run.
      I. If the state files does not exist, or the path was never previously run, continue to step 6(D).
      II. If the state file exists and path was previously run, continue to step 6(C).
      III. A state file can comprise a list of computer storage system paths, along with a generation identifier (ID). The generation ID can comprise an incremental number that is updated each time a new entry is added, or an existing entry is updated in the database. It can be that a state file does not contain duplicate entries for the same path, and one state file is created per metadata index management instance
   (C) Issue a search system scroll query to find all entries that have a generation ID that is greater than the one from the previous one. Pass the list of files to step 5.
   (D) Pass the list of files or list of directories (paths) asynchronously to an existing RAG framework that processes data. In some examples, this can be done by chunking, embedding, etc.
   (E) Update the state file to record a highest generation ID document loader processed from step 6(D).

As data is updated and deleted on a computer storage system, downstream applications, like a RAG, should be aware of those changes so that they can take the appropriate action to update and delete their own generated records. However, without the downstream applications receiving alerts of updates and deletes, they can get out of sync with data that exists on a computer storage system. This can result in an inability to recreate the downstream environment.

The present techniques can be implemented such that, when a data connector reads data from a metadata index management component storage system instance, the data connector can determine which files have been updated or deleted, and can handle those cases. For updates, the data connector can replace (delete and add) chunks and embeddings that are stale. For deletes, the connector can delete chunks and embeddings that cannot be referenced from data on the corresponding computer storage system.

The present techniques can leverage uniquely identifying and mapping each chunk and embedding back to source data on a computer storage system. The present techniques can be implemented to facilitate replacing chunks and embeddings that are stale, and/or removing them if they are no longer present on the corresponding computer storage system.

An example workflow according to the present techniques can be as follows:
1. The metadata index management component can store records in a search server, and update existing search server records based on changes to the computer storage system (e.g., updated or deleted files).

2. The data connector can leverage mapping chunks and embeddings to source files from the computer storage system.
3. The data connector can determine not only what files have been added, but also determine whether those files has been updated or deleted from the computer storage system.
4. For files that been marked as updated by the metadata index management component, the data connector can look at the mapping it created of previously generated chunks and embeddings and do the following:
   a. Create new chunks of the files with unique hashes.
   b. Determine which chunks are duplicate by comparing their unique hashes with hashes of previously generated chunks.
      Consider this example of ingesting an updated file, according to the present techniques. Suppose File A was previously ingested (that is, chunks and embeddings were created). In this example, File A had six chunks: a1, a2, a3, a4, a5, and a6. Two lists can be stored to track the association between File A and its chunks and embeddings:
      Chunk_List_for_File_A=<a1, a2, a3, a4, a5, a6>, and
      Embedding_List_For_File_A=<e1, e2, e3, e4, e5, e6>
      In the example, File A has been updated to File A'. The updated parts of File A' correspond to chunks a2 and a4 (where the other chunks are the same as with File A). So the chunks in File A' are a1, a2', a3, a4', a5, a6. This is, only chunks a2' and a4' are different from previous chunks. The lists for File A' can be:
      Chunk_List_For_File_A'=<a1, a2', a3, a4', a5, a6>, and
      Embedding_List_For_File_A'=<e1, e2', e3, e4', e5, e6>
   c. If a chunk is a duplicate, it can be that no further processing is done for that chunk. The unique hash for that chunk and embedding can be added to a temporary list (e.g., chunks_embeddings_duplicate).
      Hashes of chunks in File A' can be compared with hashes previously ingested chunks for A, and this can lead to identifying the duplicate chunks between File A and File A':
      chunks_embedding_duplicate=a1, a3, a5, a6.
      These duplicate chunks can be identified as duplicates because the hashes of these chunks in Chunk_List_for_File_A and Chunk_List_for_File_A' are the same.
   d. If a chunk is unique, embeddings can be created. Both the new chunk and embedding can be stored in their respective systems (chunk and vector database). Continuing with the example, the new chunks a2' and a4', and associated embeddings, and be added to the chunk store and vector database.
   e. Once all files have been processed, a cleanup phase can be started. The cleanup phase can compare the original list that maps chunks and embeddings generated in step 4 with that of the entries in the temporary list (chunks_embeddings_duplicate). The data connector can sort the two lists and removes duplicate entries that exist in both. What is left can be chunks and embedding that are stale. This stale list can then be processed to remove each chunk and embedding from their respective systems.

Continuing with the example, to remove the outdated (or stale) chunks from the RAG application, the following can be performed. Subtract chunks_embedding_duplicate from Chunk_list_for_File_A, such as by comparing these two lists. Remove the duplicate entries from Chunk_List_for_File_A. This leaves the stale chunks a2 and a4 in that list. This can indicate to remove chunks a2 and a4 and their associated embeddings e2 and e4 from the chunk store and embedding store for the RAG application. a2' and a4' can be added to the chunk store (and corresponding embeddings added to the embedding store).

Chunk_List_for_File_A can now be deleted, since File A no longer exists on the storage system.

5. For files that have been marked as deleted by the metadata index management component, the data connector can look at the mapping it created for previously-generated chunks and embedding, and can do the following:

a. Find the corresponding chunk and embedding in their respective systems, and delete them.

Example Architectures, Etc

FIG. 1 illustrates an example system architecture 100 that can facilitate updates and deletes in RAG ingestion versioning, in accordance with an embodiment of this disclosure.

System architecture 100 comprises computer system 102, communications network 104, and remote computer 106. In turn, computer system 102 comprises updates and deletes in RAG ingestion versioning component 108, storage system 110 (which comprises files 112), RAG application 114 (which comprises chunks 116 and embeddings 118), RAG framework 120, state file 122 (which comprises hashes 128 (of processed chunks) and mapping 130), and search system 124 (which comprises file metadata 126).

Figure 11:
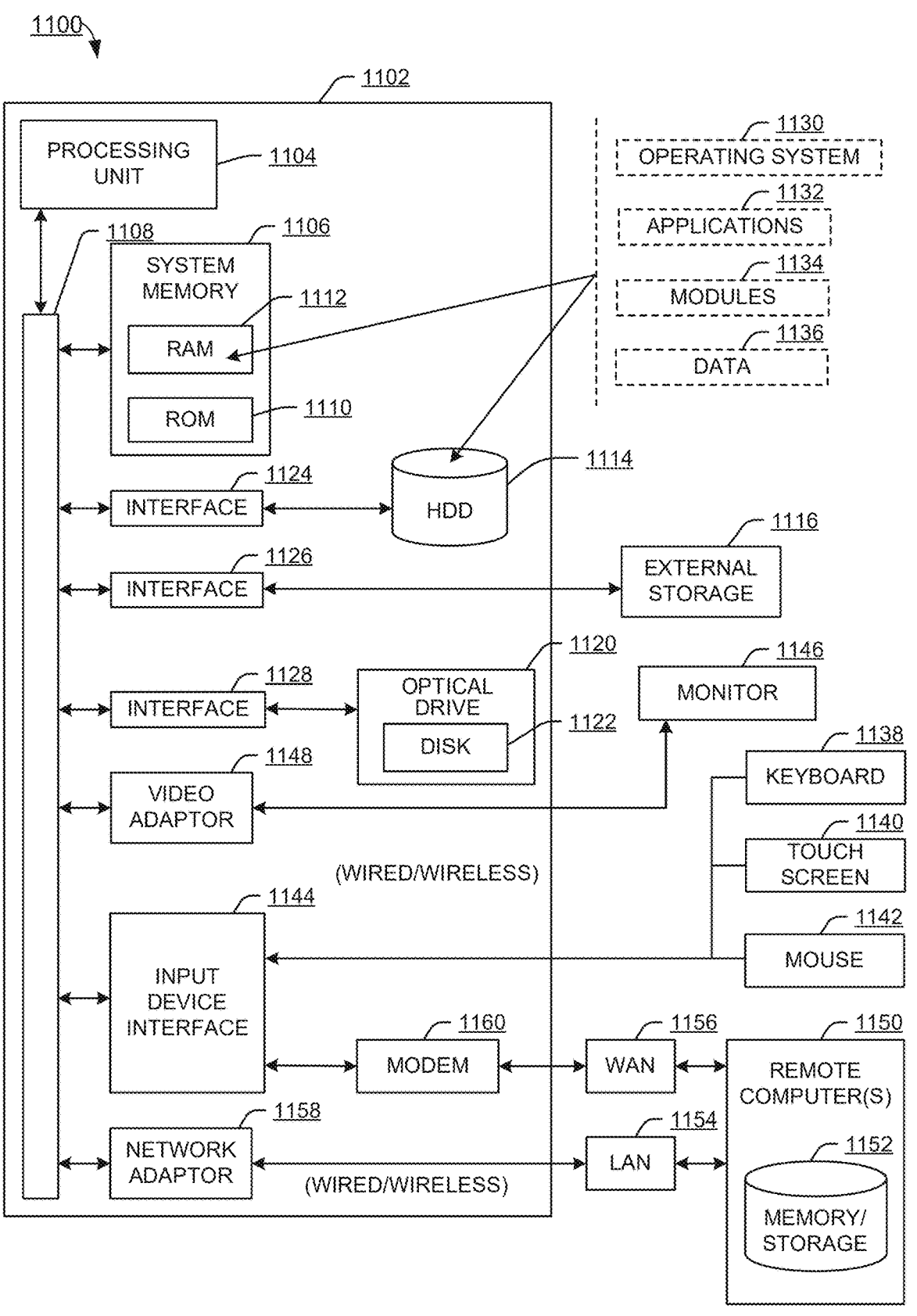
FIG. 11 illustrates an example block diagram of a computer operable to execute an embodiment of this disclosure.

Each of computer system 102 and/or remote computer 106 can be implemented with part(s) of computing environment 1100 of FIG. 11. Communications network 104 can comprise a computer communications network, such as the Internet, or an isolated private computer communications network.

RAG application 114 can respond to queries based on information in files 112 stored in storage system 110. RAG application can store information in files 112 as chunks 116 (where a file can comprise multiple chunks) and embeddings 118 (where an embedding can comprise a numerical vector representation of a chunk, and wherein a similarity search between a vector representation of a query and the embeddings can be performed as part of a RAG application responding to the query).

RAG framework 120 (in conjunction with updates and deletes in RAG ingestion versioning component 108) can ingest files 112 into RAG application 114. That is, RAG framework 120 can copy the data of files 112 to RAG application 114, including creating chunks and embeddings from files 112. In doing so, RAG framework 120 can perform versioning on the files so that only new or updated files are ingested, which can save on bandwidth and processing resources in ingesting data.

To do this, RAG framework 120 can maintain state file 122, which can include information about files 112 and a most-recent version (e.g., a generation ID) that has been ingested into RAG application 114. When performing an ingestion, RAG framework 120 can access search system 124, which can store indexed (that is, more easily searchable than unindexed data) metadata for files 112 as file metadata 126 (where storage system 110 does not index file metadata). RAG framework 120 can use file metadata 126 to determine which files have been updated since a last ingest, and ingest only those files from files 112.

In some examples, updates and deletes in RAG ingestion versioning component 108 can perform this identification of new/updated files, and pass a list of those files to RAG framework 120 for ingesting.

Where a file does not have a match, it can be chunked (such as by RAG framework 120, RAG ingestion versioning component 108, or another part of system architecture 100), and a hash value can be created for each chunk (where a hash value can comprise an output of a hash function that converts an input of arbitrary data into a hash value). Where a newly-created hash value matches a hash value of hashes 128 that is stored in state file 122, then it can be determined that a duplicate chunk has already been ingested into the RAG application, and this new chunk need not be ingested.

Where a file is updated (relative to a previously-ingested version of the file), it can be that the updated file comprises some chunks that are already ingested into RAG application 114, and some new chunks (for the updated parts of the file) that are not in RAG application 114.

As files are ingested into RAG application 114 as chunks and embeddings, mapping 130 can be updated to include an association between the file (as stored on storage system 110) and the chunks and embeddings. When a file is deleted from storage system 110, and a new iteration of ingesting data is performed, mapping 130 can be used to identify corresponding chunks and embeddings in RAG application 114, and these chunks and embeddings can be deleted from RAG application 114.

With ingested data, RAG application 114 can respond to queries that remote computer 106 makes to it via communications network 104.

In some examples, storage system 110 can, on a regular interval, transfer all new/modified metadata into search system 124. Each time this occurs, a generation ID for that new/modified metadata can be incremented. A query can be performed on search system 124 for entries that are larger than a generation ID identified in state file, and the returned entries (files and/or paths), can be deduplicated at the file/chunk level, and can be returned to RAG framework 120.

In some examples, updates and deletes in RAG ingestion versioning component 108 can implement part(s) of the process flows of FIGS. 5-10 to facilitate updates and deletes in RAG ingestion versioning.

It can be appreciated that system architecture 100 is one example system architecture for updates and deletes in RAG ingestion versioning, and that there can be other system architectures that facilitate updates and deletes in RAG ingestion versioning.

FIG. 2 illustrates another example system architecture 200 that can facilitate updates and deletes in RAG ingestion versioning, in accordance with an embodiment of this disclosure. In some examples, part(s) of system architecture 200 can be implemented by part(s) of system architecture 100 to facilitate updates and deletes in RAG ingestion versioning.

System architecture 200 comprises storage system 202, metadata index management component 204, customer supplied hardware 206 (off storage box), storage system database 208, and updates and deletes in RAG ingestion versioning component 210 (which can be similar to updates and deletes in RAG ingestion versioning component 108 of FIG. 1).

In system architecture 200, it can be that there is not a facility to implement ingestion versioning (with or without handling updates and deletes), such as because the protocol used to ingest data does not maintain a state of a previous ingestion. This can be addressed in system architecture 300 of FIG. 3, with the use of state file 320, among other components.

FIG. 3 illustrates another example system architecture 300 that can facilitate updates and deletes in RAG ingestion versioning, in accordance with an embodiment of this disclosure. In some examples, part(s) of system architecture 300 can be implemented by part(s) of system architecture 100 to facilitate updates and deletes in RAG ingestion versioning.

System architecture 300 comprises storage system 302, customer RAG application 304, other RAG and application components 306, RAG framework 308, storage system metadata index management loader 310, existing file and directory loader 312, storage system connector to metadata index management 314, other RAG framework components 316, storage system database for metadata index management 318, and state file 320.

FIG. 4 illustrates an example state file 400 that can facilitate updates and deletes in RAG ingestion versioning, in accordance with an embodiment of this disclosure. In some examples, part(s) of state file 400 can be implemented by part(s) of system architecture 100 to facilitate updates and deletes in RAG ingestion versioning.

State file 400 can be similar to state file 320 of FIG. 3, and can indicate a last version ("generation") of different files and/or paths that have been ingested into a RAG application. State file 400 can also store hash values for chunks that have been previously-ingested (and are currently in use) by a RAG application. State file 400 can also store a mapping between files that have been ingested into a RAG application, where what is stored by the RAG application is chunks and embeddings (rather than the files themselves), and those chunks and embeddings.

Example Process Flows

FIG. 5 illustrates an example process flow 500 that can facilitate updates and deletes in RAG ingestion versioning, in accordance with an embodiment of this disclosure. In some examples, one or more embodiments of process flow 500 can be implemented by system architecture 100 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of process flow 600 of FIG. 6, process flow 700 of FIG. 7, process flow 800 of FIG. 8, process flow 900 of FIG. 9, and/or process flow 1000 of FIG. 10.

Process flow 500 begins with 502, and moves to operation 504.

Operation 504 depicts the metadata index management component storing records in a search server, and updating existing search server records based on changes to the computer storage system (e.g., updated or deleted files).

After operation 504, process flow 500 moves to operation 506.

Operation 506 depicts the data connector accessing a mapping of chunks and embeddings to source files from the computer storage system.

After operation 506, process flow 500 moves to operation 508.

Operation 508 depicts the data connector determining what files have been added, and whether those files has been updated or deleted from the computer storage system.

After operation 508, process flow 500 moves to operation 510.

Operation 510 depicts, for files that been marked as updated by the metadata index management component, the data connector analyzing the mapping of previously generated chunks and embeddings, and implementing process flow 600 of FIG. 6.

After operation 510, process flow 500 moves to operation 512.

Operation 512 depicts, for files that been marked as deleted by the metadata index management component, the data connector analyzing the mapping for previously-generated chunks and embedding, and deleting chunks and embeddings. This can be implemented in a similar manner as process flow 700 of FIG. 7.

After operation 512, process flow 500 moves to 514, where process flow 500 ends.

FIG. 6 illustrates another example process flow 600 that can facilitate updates and deletes in RAG ingestion versioning, in accordance with an embodiment of this disclosure. In some examples, one or more embodiments of process flow 600 can be implemented by system architecture 100 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of process flow 500 of FIG. 5, process flow 700 of FIG. 7, process flow 800 of FIG. 8, process flow 900 of FIG. 9, and/or process flow 1000 of FIG. 10.

In some examples, process flow 600 can be used to implement operation 510 of FIG. 5.

Process flow 600 begins with 602, and moves to operation 604.

Operation 604 depicts creating new chunks of files with unique hashes.

After operation 604, process flow 600 moves to operation 606.

Operation 606 depicts determining which chunks are duplicate by comparing their unique hashes with hashes of previously generated chunks.

After operation 606, process flow 600 moves to operation 608.

Operation 608 depicts, if a chunk is a duplicate, add a hash for that chunk and corresponding embedding to chunks_embeddings_duplicate.

After operation 608, process flow 600 moves to operation 610.

Operation 610 depicts, if a chunk is unique, creating a corresponding embedding; storing the new chunk and embedding in a chunk database and a vector database.

After operation 610, process flow 600 moves to operation 612.

Operation 612 depicts, after processing the files, initiating a cleanup phase. The cleanup phase can compare the original list with that of the entries in chunks_embeddings_duplicate. The data connector can sort the two lists and removes duplicate entries that exist in both. What is left can be chunks and embedding that are stale. This stale list can then be processed to remove each chunk and embedding from their respective systems.

After operation 612, process flow 600 moves to 614, where process flow 600 ends.

Figure 7:
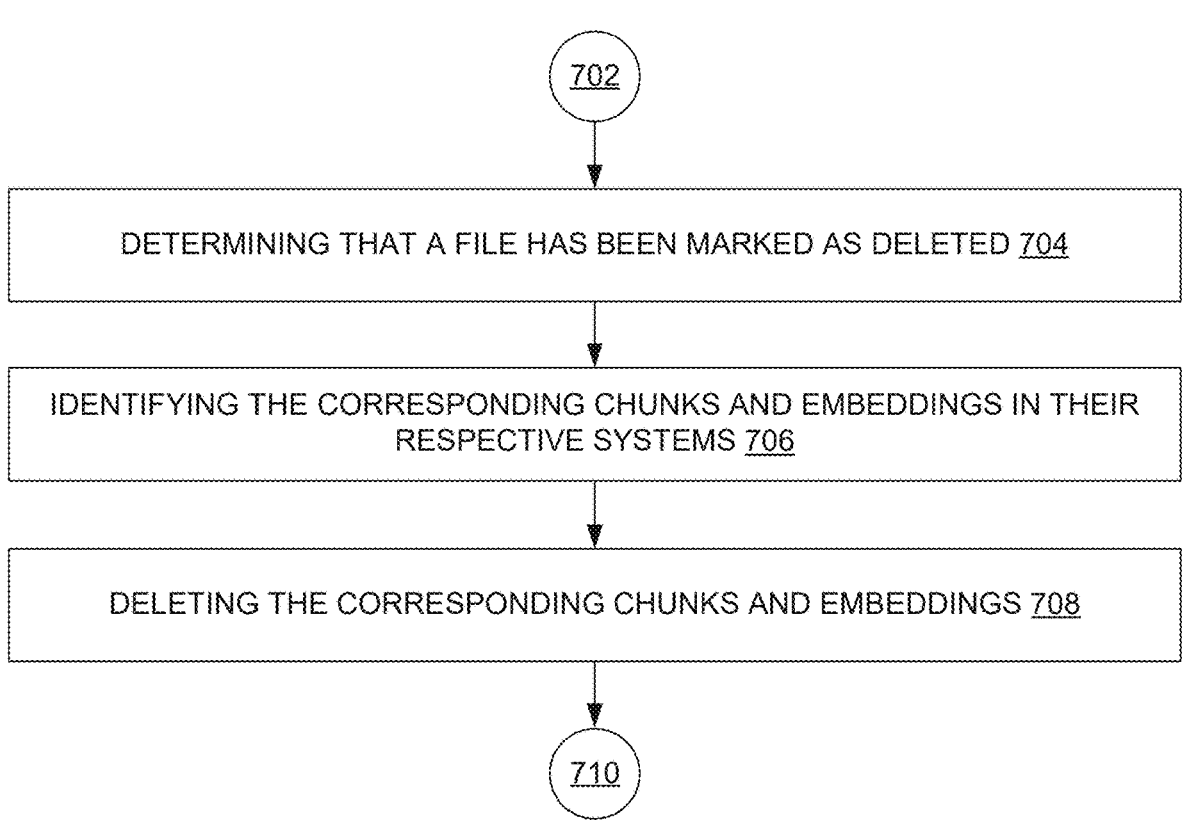
FIG. 7 illustrates another example process flow that can facilitate updates and deletes in RAG ingestion versioning, in accordance with an embodiment of this disclosure.

FIG. 7 illustrates another example process flow 700 that can facilitate updates and deletes in RAG ingestion versioning, in accordance with an embodiment of this disclosure. In some examples, one or more embodiments of process flow 700 can be implemented by system architecture 100 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of process flow 500 of FIG. 5, process flow 600 of FIG. 6, process flow 800 of FIG. 8, process flow 900 of FIG. 9, and/or process flow 1000 of FIG. 10.

In some examples, process flow 700 can be used to implement operation 512 of FIG. 5.

Process flow 700 begins with 702, and moves to operation 704.

Operation 704 depicts determining that a file has been marked as deleted.

After operation 704, process flow 700 moves to operation 706.

Operation 706 depicts identifying the corresponding chunks and embeddings in their respective systems.

After operation 706, process flow 700 moves to operation 708.

Operation 708 depicts deleting the corresponding chunks and embeddings.

After operation 708, process flow 700 moves to 710, where process flow 700 ends.

FIG. 8 illustrates another example process flow 800 that can facilitate updates and deletes in RAG ingestion versioning, in accordance with an embodiment of this disclosure. In some examples, one or more embodiments of process flow 800 can be implemented by system architecture 100 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts storing a checkpoint that comprises pairs and first hash values, wherein respective pairs of the pairs comprise respective identifications of at least some respective first data stored in a storage system and respective second generation identifiers that correspond to the respective data, and wherein respective first hash values of the first hash values correspond to first chunks of the at least some respective first data. Using the example of FIG. 1, the checkpoint can be similar to state file 122, the storage system can be similar to storage system 110, and the first hash values can be similar to hashes 128.

After operation 804, process flow 800 moves to operation 806.

Operation 806 depicts, based on executing a retrieval-augmented generation process comprising performance of an iteration of ingesting data from the storage system and to send the data to be ingested by a retrieval-augmented generation system, wherein the retrieval-augmented generation process is configured to ingest the data via a communications protocol that omits tracking of previously-ingested data; querying a search system to identify at least one first portion of the data that has at least one respective third generation identifier that is greater than the respective second generation identifiers in the checkpoint, wherein the search system stores respective metadata of respective first data from the storage system, and wherein the respective metadata comprises respective first generation identifiers that indicate respective updates to the respective first data; creating second chunks from the at least one first portion of the data; in response to respective second chunks of the second chunks being determined to be duplicates of respective first chunks of the first chunks, based on the respective first hash values and respective second hash values of the respective second chunks, storing first identifiers of the respective second chunks, to produce stored chunk identifiers; removing the stored chunk identifiers from second identifiers of chunks that correspond to chunks that existed in the retrieval-augmented generation system prior to the performance of the iteration of the ingesting of the data, to produce stale chunk identifiers; removing, from the retrieval-augmented generation system, third chunks that are identified by the stale chunk identifiers, and in response to the respective second chunks being determined to be unique relative to the respective first chunks, storing the respective second chunks in the retrieval-augmented generation system.

Continuing with the example of FIG. 1, the retrieval-augmented generation process can be similar to RAG framework 120, the retrieval-augmented generation system can be similar to RAG application 114, and the search system can be similar to search system 124.

In some examples, the removing of the third chunks comprises removing embeddings that correspond to the third chunks from the retrieval-augmented generation system. That is, updating chunks can include removing stale embeddings for stale chunks.

In some examples, the storing of the respective second chunks in the retrieval-augmented generation system comprises storing corresponding embeddings from the retrieval-augmented generation system. That is, updating chunks can include adding new embeddings for the new chunks.

In some examples, the at least one first portion of the data comprises a second version of a file, wherein fourth chunks comprise a subset of the first chunks, the fourth chunks comprise a first version of the file, and the second version of the file is newer than the first version of the file. That is, a file can have been ingested in a previous iteration of ingesting data. In a current iteration of ingesting data, an updated version of the file can be ingested. It can be that, with an updated version of a file, some chunks for the file are already ingested in a RAG application (that is, that part of the file was not updated) and other chunks for the file are new relative to what is already ingested in the RAG application.

In some examples, the third chunks comprise a first subset of fourth chunks, wherein a file comprises the fourth chunks, and wherein the removing of the third chunks comprises refraining from removing fifth chunks that comprise a second subset of the fourth chunks. That is, for an updated file it can be that only part of the file is updated in a RAG application—new chunks for the file are ingested, while previously-ingested chunks that are duplicate of some other chunks from the updated file are maintained in the RAG application.

In some examples, the iteration of the ingesting of the data comprises a first iteration, and the performance of the iteration of the ingesting of the data from the storage system comprises, based on determining that a first file has been deleted on the storage system subsequent to being ingested in a second iteration that occurred prior to the first iteration, removing fourth chunks that correspond to the first file from the retrieval-augmented generation system. That is, where a file has been deleted from a storage system, and that file was previously ingested into a RAG application, that file's chunks can be removed from the RAG application.

In some examples, the removing of the fourth chunks comprises determining that the fourth chunks correspond to the first file based on an association between the first file and the fourth chunks that is stored in the checkpoint. That is, a mapping (e.g., mapping 130 of FIG. 1) between files and chunks can be used to determine which chunks to delete from a RAG application.

In some examples, the removing of the fourth chunks comprises removing embeddings that correspond to the fourth chunks from the retrieval-augmented generation system. That is, removing chunks from a RAG application (where the chunks correspond to a file deleted from a storage system) can include removing corresponding embeddings from the RAG application.

After operation 806, process flow 800 moves to 808, where process flow 800 ends.

FIG. 9 illustrates another example process flow 900 that can facilitate updates and deletes in RAG ingestion versioning, in accordance with an embodiment of this disclosure. In some examples, one or more embodiments of process flow 900 can be implemented by system architecture 100 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 500 of FIG. 5, process flow 600 of FIG. 6, process flow 700 of FIG. 7, process flow 800 of FIG. 8 and/or process flow 1000 of FIG. 10.

Process flow 900 begins with 902, and moves to operation 904.

Operation 904 depicts, based on performance of an iteration of ingesting data from a storage system and to send the data to be ingested by a retrieval-augmented generation system, querying a search system to identify at least one first portion of the data that has at least one respective third generation identifier that is greater than respective second generation identifiers in a checkpoint that comprises pairs and first hash values, wherein respective pairs of the pairs comprise respective identifications of at least some respective first data stored in the storage system and respective second generation identifiers that correspond to the respective data, wherein respective first hash values of the first hash values correspond to first chunks of the at least some respective first data, wherein the search system stores respective metadata of respective first data from the storage system, and wherein the respective metadata comprises respective first generation identifiers that indicate respective updates to the respective first data. In some examples, operation 904 can be implemented in a similar manner as operation 804 and 806 (as applied to performance of an iteration of ingesting data) of FIG. 8.

After operation 904, process flow 900 moves to operation 906.

Operation 906 depicts creating second chunks from the at least one first portion of the data. In some examples, operation 906 can be implemented in a similar manner as operation 806 of FIG. 8, as applied to creating second chunks.

After operation 906, process flow 900 moves to operation 908.

Operation 908 depicts, responsive to respective second chunks of the second chunks being determined to be duplicates of respective first chunks of the first chunks, based on the respective first hash values and respective second hash values of the respective second chunks, storing first identifiers of the respective second chunks, to produce stored chunk identifiers. In some examples, operation 908 can be implemented in a similar manner as operation 806 of FIG. 8, as applied to storing first identifiers of the respective second chunks.

After operation 908, process flow 900 moves to operation 910.

Operation 910 depicts removing the stored chunk identifiers from second identifiers of chunks that correspond to chunks that existed in the retrieval-augmented generation system prior to the performance of the iteration of the ingesting of the data, to produce stale chunk identifiers. In some examples, operation 910 can be implemented in a similar manner as operation 806 of FIG. 8, as applied to removing the stored chunk identifiers.

After operation 910, process flow 900 moves to operation 912.

Operation 912 depicts removing, from the retrieval-augmented generation system, third chunks that are identified by the stale chunk identifiers. In some examples, operation 912 can be implemented in a similar manner as operation 806 of FIG. 8, as applied to removing third chunks.

After operation 912, process flow 900 moves to operation 914.

Operation 914 depicts, responsive to the respective second chunks being determined to be unique relative to the respective first chunks, storing the respective second chunks in the retrieval-augmented generation system. In some examples, operation 914 can be implemented in a similar manner as operation 806 of FIG. 8, as applied to storing the respective second chunks.

In some examples, the at least one first portion of the data comprises files, and the removing of the stored chunk identifiers from the second identifiers of chunks occurs after each of the files have been ingested. That is, once all files for an iteration of ingesting data have been processed, a cleanup phase can be implemented, where stale chunks are removed from a RAG application.

In some examples, the performance of the iteration of the ingesting of the data from the storage system comprises, based on determining that a file that has been ingested into the storage system has been deleted on the storage system, removing fourth chunks that correspond to the file from the retrieval-augmented generation system. That is, chunks in a RAG application that correspond to deleted files in a storage system can be removed from the RAG application.

In some examples, the checkpoint comprises a mapping between the file and the fourth chunks, and wherein the removing of the fourth chunks comprises determining that the fourth chunks correspond to the file based on the checkpoint. This mapping can be similar to mapping 130 of FIG. 1.

In some examples, embeddings of the retrieval-augmented generation system correspond to the file, and the removing of the fourth chunks comprises removing the embeddings from the retrieval-augmented generation system. That is, where chunks are removed from a RAG application, corresponding embeddings can also be removed from a RAG application.

In some examples, the checkpoint comprises a mapping between the file and the embeddings, and the removing of the fourth chunks comprises removing the embeddings from the retrieval-augmented generation system based on the mapping. This mapping can be similar to mapping 130 of FIG. 1.

After operation 914, process flow 900 moves to 916, where process flow 900 ends.

FIG. 10 illustrates another example process flow 1000 that can facilitate updates and deletes in RAG ingestion versioning, in accordance with an embodiment of this disclosure. In some examples, one or more embodiments of process flow 1000 can be implemented by system architecture 100 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts, based on ingesting data from a storage system and to a retrieval-augmented generation system, querying a search system to identify at least one first portion of the data that has at least one respective third generation identifier that is greater than respective second generation identifiers in a state file that comprises pairs and first hash values, wherein respective pairs of the pairs comprise respective identifications of at least some respective first data stored in the storage system and respective second generation identifiers that correspond to the respective data, and wherein respective first hash values of the first hash values correspond to first chunks of the at least some respective first data, and wherein the search system stores respective metadata of respective first data from the storage system that comprises respective first generation identifiers that indicate respective updates to the respective first data. In some examples, operation 1004 can be implemented in a similar manner as operation 804 and 806 (as applied to performance of an iteration of ingesting data) of FIG. 8.

After operation 1004, process flow 1000 moves to operation 1006.

Operation 1006 depicts creating second chunks from the at least one first portion of the data. In some examples, operation 1006 can be implemented in a similar manner as operation 806 of FIG. 8, as applied to creating second chunks.

After operation 1006, process flow 1000 moves to operation 1008.

Operation 1008 depicts, where the respective first hash values and respective second hash values of respective second chunks of the second chunks indicate that at least some of the respective second chunks of the second chunks are duplicates of respective first chunks of the first chunks, storing first identifiers of the at least some of the respective second chunks, to produce stored chunk identifiers. In some examples, operation 908 can be implemented in a similar manner as operation 806 of FIG. 8, as applied to storing first identifiers of the respective second chunks.

After operation 1008, process flow 1000 moves to operation 1010.

Operation 1010 depicts removing the stored chunk identifiers from second identifiers of chunks that correspond to chunks that existed in the retrieval-augmented generation system prior to the ingesting of the data, to produce stale chunk identifiers. In some examples, operation 910 can be implemented in a similar manner as operation 806 of FIG. 8, as applied to removing the stored chunk identifiers.

After operation 1010, process flow 1000 moves to operation 1012.

Operation 1012 depicts removing, from the retrieval-augmented generation system, third chunks that are identified by the stale chunk identifiers. In some examples, operation 912 can be implemented in a similar manner as operation 806 of FIG. 8, as applied to removing third chunks.

In some examples, operation 1012 comprises where the respective second chunks are determined to be unique relative to the respective first chunks, storing the respective second chunks in the retrieval-augmented generation system. That is, new chunks for an updated file can be stored in a RAG application, where the updated file is being ingested.

In some examples, the ingesting of the data comprises based on determining that a file that has been ingested into the storage system has been deleted on the storage system, removing fourth chunks that correspond to the file from the retrieval-augmented generation system. That is, chunks in a RAG application that correspond to deleted files in a storage system can be removed from the RAG application.

In some examples, the state file comprises an association between the file and the fourth chunks, and the removing of the fourth chunks comprises determining that the fourth chunks correspond to the file based on the state file. This mapping can be similar to mapping 130 of FIG. 1.

In some examples, embeddings of the retrieval-augmented generation system correspond to the file, and the removing of the fourth chunks comprises removing the embeddings from the retrieval-augmented generation system. That is, where chunks are removed from a RAG application, corresponding embeddings can also be removed from a RAG application.

In some examples, the state file comprises an association between the file and the embeddings, and the removing of the fourth chunks comprises removing the embeddings from the retrieval-augmented generation system based on the association. This mapping can be similar to mapping 130 of FIG. 1.

After operation 1012, process flow 1000 moves to 1014, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of computer system 102 and/or remote computer 106 of FIG. 1.

In some examples, computing environment 1100 can implement one or more embodiments of the process flows of FIGS. 5-10 to facilitate updates and deletes in RAG ingestion versioning.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1116 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

storing a checkpoint that comprises pairs and first hash values, wherein the checkpoint identifies data that has been ingested into a retrieval-augmented generation system, wherein each pair of the pairs comprises an identification of at least some of first data stored in a storage system and a second generation identifier that corresponds to the at least some of the first data, and wherein each first hash value of the first hash values comprises a hash of a first chunk of the at least some of the first data, wherein a group of first chunks comprises the first chunk;

based on executing a retrieval-augmented generation process comprising performance of an iteration of ingesting more data from the storage system and to send the data to be ingested by the retrieval-augmented generation system, wherein the retrieval-augmented generation process is configured to ingest the data via a communications protocol that omits tracking of previously-ingested data, querying a search system to identify at least one first portion of the data that has at least one respective third generation identifier that is greater than the respective second generation identifiers in the checkpoint, wherein the search system stores respective metadata of respective first data from the storage system, and wherein the respective metadata comprises respective first generation identifiers that indicate respective updates to the respective first data, creating second chunks from the at least one first portion of the data, in response to respective second chunks of the second chunks being determined to be duplicates of respective first chunks of the group of first chunks, based on the respective first hash values and respective second hash values of the respective second chunks, storing first identifiers of the respective second chunks, to produce stored chunk identifiers, removing the stored chunk identifiers from second identifiers of chunks that correspond to chunks that existed in the retrieval-augmented generation system prior to the performance of the iteration of the ingesting of the data, to produce stale chunk identifiers, removing, from the retrieval-augmented generation system, third chunks that are identified by the stale chunk identifiers, and in response to the respective second chunks being determined to be unique relative to the respective first chunks, storing the respective second chunks in the retrieval-augmented generation system, wherein the second chunks correspond to portions of the data that are updated relative to what is stored in the retrieval-augmented generation system.

2. The system of claim 1, wherein the removing of the third chunks comprises removing embeddings that correspond to the third chunks from the retrieval-augmented generation system.

3. The system of claim 1, wherein the storing of the respective second chunks in the retrieval-augmented generation system comprises storing corresponding embeddings from the retrieval-augmented generation system.

4. The system of claim 1, wherein the at least one first portion of the data comprises a second version of a file, wherein fourth chunks comprise a subset of the first chunks, wherein the fourth chunks comprise a first version of the file, and wherein the second version of the file is newer than the first version of the file.

5. The system of claim 1, wherein the third chunks comprise a first subset of fourth chunks, wherein a file comprises the fourth chunks, and wherein the removing of the third chunks comprises refraining from removing fifth chunks that comprise a second subset of the fourth chunks.

6. The system of claim 1, wherein the iteration of the ingesting of the more data comprises a first iteration, and wherein the performance of the iteration of the ingesting of the data from the storage system comprises:

based on determining that a first file has been deleted on the storage system subsequent to being ingested in a second iteration that occurred prior to the first iteration, removing fourth chunks that correspond to the first file from the retrieval-augmented generation system.

7. The system of claim 6, wherein the removing of the fourth chunks comprises:

determining that the fourth chunks correspond to the first file based on an association between the first file and the fourth chunks that is stored in the checkpoint.

8. The system of claim 6, wherein the removing of the fourth chunks comprises:

removing embeddings that correspond to the fourth chunks from the retrieval-augmented generation system.

9. A method, comprising:

based on performance of an iteration of ingesting data from a storage system and to send the data to be ingested by a retrieval-augmented generation system, querying, by a system comprising at least one processor, a search system to identify at least one first portion of the data that has at least one respective third generation identifier that is greater than respective second generation identifiers in a checkpoint that comprises pairs and first hash values, wherein each pair of the pairs comprises an identification of at least some of first data stored in a storage system and a second generation identifier that corresponds to the at least some of the first data, wherein each first hash value of the first hash values comprises a hash of a first chunk of the at least some of the first data, wherein a group of first chunks comprises the first chunk, wherein the search system stores respective metadata of respective first data from the storage system, and wherein the respective metadata comprises respective first generation identifiers that indicate respective updates to the respective first data;

creating, by the system, second chunks from the at least one first portion of the data;

responsive to respective second chunks of the second chunks being determined to be duplicates of respective first chunks of the group of first chunks, based on the respective first hash values and respective second hash values of the respective second chunks, storing, by the system, first identifiers of the respective second chunks, to produce stored chunk identifiers;

removing, by the system, the stored chunk identifiers from second identifiers of chunks that correspond to chunks that existed in the retrieval-augmented generation system prior to the performance of the iteration of the ingesting of the data, to produce stale chunk identifiers;

removing, by the system and from the retrieval-augmented generation system, third chunks that are identified by the stale chunk identifiers; and responsive to the respective second chunks being determined to be unique relative to the respective first chunks, storing, by the system, the respective second chunks in the retrieval-augmented generation system.

10. The method of claim 9, wherein the at least one first portion of the data comprises files, and wherein the removing of the stored chunk identifiers from the second identifiers of chunks occurs after each of the files have been ingested.

11. The method of claim 9, wherein the performance of the iteration of the ingesting of the data from the storage system comprises:

based on determining that a file that has been ingested into the storage system has been deleted on the storage system, removing fourth chunks that correspond to the file from the retrieval-augmented generation system.

12. The method of claim 11, wherein the checkpoint comprises a mapping between the file and the fourth chunks, and wherein the removing of the fourth chunks comprises:

determining that the fourth chunks correspond to the file based on the checkpoint.

13. The method of claim 11, wherein embeddings of the retrieval-augmented generation system correspond to the file, and wherein the removing of the fourth chunks comprises:

removing the embeddings from the retrieval-augmented generation system.

14. The method of claim 11, wherein the checkpoint comprises a mapping between the file and the embeddings, and wherein the removing of the fourth chunks comprises:

removing the embeddings from the retrieval-augmented generation system based on the mapping.

15. A non-transitory computer-readable medium comprising instructions that, in response to execution, cause a system comprising at least one processor to perform operations, comprising:

based on ingesting data from a storage system and to a retrieval-augmented generation system, querying a search system to identify at least one first portion of the data that has at least one respective third generation identifier that is greater than respective second generation identifiers in a state file that comprises pairs and first hash values, wherein each pair of the pairs comprises an identification of at least some of first data stored in a storage system and a second generation identifier that corresponds to the at least some of the first data, wherein each first hash value of the first hash values comprises a hash of a first chunk of the at least some of the first data, wherein a group of first chunks comprises the first chunk, and wherein the search system stores respective metadata of respective first data from the storage system that comprises respective first generation identifiers that indicate respective updates to the respective first data;

creating second chunks from the at least one first portion of the data;

where the respective first hash values and respective second hash values of respective second chunks of the second chunks indicate that at least some of the respective second chunks of the second chunks are duplicates of respective first chunks of the first chunks, storing first identifiers of the at least some of the respective second chunks, to produce stored chunk identifiers;

removing the stored chunk identifiers from second identifiers of chunks that correspond to chunks that existed in the retrieval-augmented generation system prior to the ingesting of the data, to produce stale chunk identifiers; and removing, from the retrieval-augmented generation system, third chunks that are identified by the stale chunk identifiers.

16. The non-transitory computer-readable medium of claim 15, wherein the operations further comprise:

where the respective second chunks are determined to be unique relative to the respective first chunks, storing the respective second chunks in the retrieval-augmented generation system.

17. The non-transitory computer-readable medium of claim 15, wherein the ingesting of the data comprises:

based on determining that a file that has been ingested into the storage system has been deleted on the storage system, removing fourth chunks that correspond to the file from the retrieval-augmented generation system.

18. The non-transitory computer-readable medium of claim 17, wherein the state file comprises an association between the file and the fourth chunks, and wherein the removing of the fourth chunks comprises:

determining that the fourth chunks correspond to the file based on the state file.

19. The non-transitory computer-readable medium of claim 17, wherein embeddings of the retrieval-augmented generation system correspond to the file, and wherein the removing of the fourth chunks comprises:

removing the embeddings from the retrieval-augmented generation system.

20. The non-transitory computer-readable medium of claim 19, wherein the state file comprises an association between the file and the embeddings, and wherein the removing of the fourth chunks comprises:

removing the embeddings from the retrieval-augmented generation system based on the association.

* * * * *